United States Patent [19]

Hansen

[11] 4,003,640
[45] Jan. 18, 1977

[54] ELECTRO-HYDRAULIC DRIVER FOR DEFORMABLE FACE PLATE

[75] Inventor: Siegfried Hansen, Los Angeles, Calif.

[73] Assignee: Hughes Aircraft Company, Culver City, Calif.

[22] Filed: June 23, 1975

[21] Appl. No.: 589,510

[52] U.S. Cl. .............................. 350/310; 350/295
[51] Int. Cl.² .......................................... G02B 5/08
[58] Field of Search ................. 350/310, 295, 288

[56] References Cited

UNITED STATES PATENTS

| | | | |
|---|---|---|---|
| 3,140,347 | 7/1964 | Cohen | 350/295 |
| 3,229,578 | 1/1966 | Smith | 350/295 |
| 3,299,368 | 1/1967 | Klebba | 350/295 |
| 3,420,598 | 1/1969 | Goss | 350/295 |

FOREIGN PATENTS OR APPLICATIONS 1,060,662   3/1967   United Kingdom ............ 350/295

Primary Examiner—John K. Corbin
Assistant Examiner—Jon W. Henry
Attorney, Agent, or Firm—Allen A. Dicke; William H. MacAllister

[57] ABSTRACT

Electro-hydraulic driver has an electro-mechanical actuator which controls the hydraulic fluid flow control orifice. The hydraulic fluid orifice is an annulus which is connected to a cylinder having minimum volume which is supplied from a hydraulic source through a flow restriction. The piston acts against a spring so that with electrical actuation, piston motion is controlled.

4 Claims, 3 Drawing Figures

ELECTRO-HYDRAULIC DRIVER FOR DEFORMABLE FACE PLATE

BACKGROUND

This invention is directed to an electro-hydraulic driver, and particularly a driver which is capable of high frequency response.

The interface between electronic and mechanical equipment requires an electro-hydraulic-mechanical servo valve capable of responding in a suitable manner to provide hydraulic actuation of a mechanical structure under the conditions imposed upon it by the system frequency requirements, the character of the electronic signal and the mechanical structure related to the hydraulic system. System frequency increases are continuously demanded for electro-hydraulic servo valves, often without corresponding improvements in the related equipment to which the servo valve is to be applied. Increasing demands for higher system frequency continuously make demands for higher frequency of operation of electro-hydraulic valves.

SUMMARY

In order to aid in the understanding of this invention it can be stated in essentially summary form that it is directed to an electro-hydraulic driver which includes a hydraulic valve opening with an annular orifice with the opening height controlled by an electro-mechanical device to minimize hydraulic pressure on the electro-mechanical device and maximize annular flow area change with change in actuation.

Accordingly, it is an object of this invention to provide an electro-hydraulic driver capable of controlling hydraulic fluid from an electronic signal at a higher frequency than previously achieved. It is a further object to provide an electro-hydraulic driver which is capable of driving a mechanical structure with a low volume hydraulic cylinder from an electronic signal at a higher frequency than previously achieved. It is another object to provide an electro-hydraulic driver where the control of the hydraulic fluid is achieved with a lower hydraulic force on the electronically responsive device than has previously been achieved, together with large flow. It is a further object to provide an electro-hydraulic driver of small size so that it can be employed in arrays to drive adjacent parts of a mechanical structure so that each driver represents a mechanical output for a signal channel. It is a further object to provide an electro-hydraulic driver which is capable of use in sets for the adjustment of apertures or different parts of a laser mirror to provide for an active optical system for providing phase correction at the target in a laser system.

Other objects and advantages of this invention will become apparent from a study of the following portion of the specification, the claims and the attached drawings.

DESCRIPTION

There are a number of situations in which an electro-hydraulic mechanical actuator is useful, particularly one which operates at high frequency response and with a reasonable mechanical output force as compared to the input signal. The apertures in Thomas R. O'Meara U.S. Pat. Nos. 3,727,223; 3,731,103; and 3,764,213 are examples of arrangements in which an electrical signal can control a device to maximize output. In Thomas R. O'Meara U.S. Pat. 3,967,899 ,the aperture is mirror 64 in FIG. 8. The present electrohydraulic actuator is described in connection with control of a mirror in an optical system to control the optical path as described in these patents and application.

Figure 1:
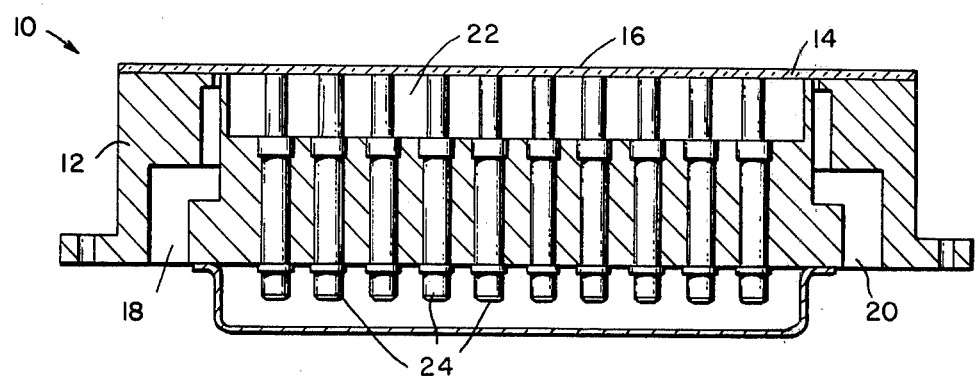
FIG. 1 is a section through a laser mirror normal to the surface of the mirror.

FIG. 1 illustrates mirror 10 having body 12 and face plate 14. Face 16 of face plate 14 is of reflective character and is placed in an optical system of the nature described in the O'Meara patents. Coolant fluid connections 18 and 20 permit the coolant flow.

Face plate 14 is secured on body 12 and positioned over cavity 22 which permits the flexure of the portion of the face plate over the cavity. A plurality of actuators 24 are illustrated as being secured in body 12 and acting against the underside of face plate 14. By individual control of actuators 24 face 16 of face plate 14 can be adjusted in accordance with the optical requirements.

Figure 2:
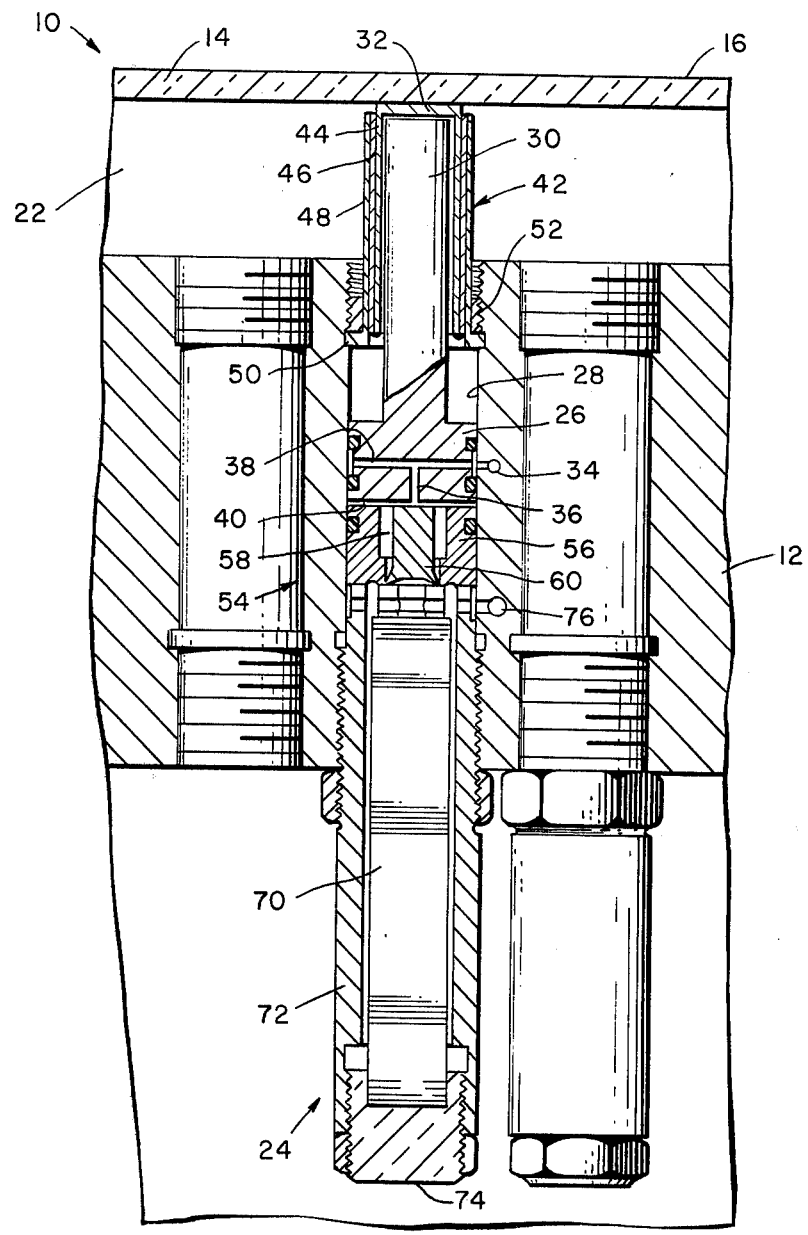
FIG. 2 is an enlarged partial section showing the details of one of the electro-hydraulic drivers which is shown mostly as a section on the diameter.

FIG. 2 shows piston 26 axially slidable in cylinder 28. Piston rod 30 is positioned within cup 32 which bears against the back side of face plate 14. Piston 26 is urged upward by fluid pressure, preferably hydraulic fluid which is supplied through inner drilled passage 34 through inner drilling 38 in the piston and flow control orifice 36 to piston head space 40. The volume of the passages beyond orifice 36 and the volume of head space 40 are kept as small as possible to minimize the volume of the fluid subject to compression with pressure changes. Fluid pressure in head space 40 urges piston rod 30 upward to act through the base of cup 32 to urge face plate 16 upward, as seen in FIG. 2.

Spring 42 is stressed by upward motion of piston rod 30. Spring 42 is a very stiff spring. In order to obtain considerable stiffness in the small space, a tubular spring construction is the preferred embodiment. Inner tube 44 represents the side walls of cup 32 with the side walls integrally formed with the bottom of the cup positioned between the end of the piston rod and face plate 14. Intermediate tube 46 surrounds inner tube 44 and the lower ends of them are secured together at the bottom, around the entire circumference. Outer tube 48 surrounds intermediate tube 46. These two tubes are secured together at their top ends, and around their entire circumference. Outer tube 48 has outwardly extending flange 50 at its lower end. Flange 50 is positioned against a shoulder at the top of cylinder bore 28 and is held in place by ring nut 52. Thus when the piston moves upward the spring is stressed to apply return force onto the piston.

Control of the pressure in head space 40 is accomplished by feeding head space 40 with hydraulic fluid under pressure through orifice 36 from the source of hydraulic fluid under pressure connected to passage 34 and by controlling the outflow from head space 40 by means of valve 54. Valve 54 comprises valve plate 56 which has a valve bore 58 therein and valve plug 60 which defines annular valve orifice 62, see FIG. 3. Valve disc 64 has a flat top surface 66 to act with respect to valve plate 56 and valve plug 60 to control the outflow from orifice 62. The faces of the valve plate and valve plug are relieved around the orifice and valve disc 64 has inner drilling 68 to permit flow of fluid to drain from orifice 62 both radially inward through port 68 and outward into the area around disc 64 from annular orifice 62. This provides twice the radially directed flow area as compared to a cylindrical orifice with very much less area on the valve disc upon which pressure acts from the orifice. This arrangement doubles controllable flow and at the same time substantially reduces by more than an order of magnitude the amount of control force required. Valve plate 56 of valve 54 together with the valve plug 60 are fixed in body 12 while valve disc 64 is movably mounted to control the outflow through annular valve orifice 62.

An electro-mechanical transducer is required to move the valve disc, when an electric signal is the input. In the present case piezoelectric device 70 is provided. Housing 72 is screwed into body 12 and supports the bottom of device 70 fixedly with respect to body 12. Plug 74 in the bottom of the housing permits adjustment of the piezoelectric device, while the upper edge of housing 70 provides the support which fixes valve plate 56 within body 12. The upper portion of body 12 is radially slotted to permit outflow of hydraulic fluid from the valve area to hydraulic drain 76.

The piezoelectric device 70 is preferably a piezoelectric ceramic tube. In such a case, the tube is excited radially to produce useful motion in the axial direction to control the position of valve disc 64. Alternatively, a stack of piezoelectric discs could be used, but it is preferable to employ the tube because of the greater convenience in electrical attachment. In either case, appropriate electrical attachment to the piezoelectric device is accomplished so that electrical excitation causes motion of valve disc 64. The motion of valve disc 64 controls the drain of hydraulic fluid from head space 40, and with valve disc 64 raised the annular valve orifice 62 is reduced so that the pressure rises in head space 40. With the head space 40 being fed through orifice 36 the pressure in the head space 40 is controlled by these two orifice impedances. With an increase in head space pressure, piston 26 moves upward against the restraint of spring 42 to raise that portion of face plate 14.

Figure 3:
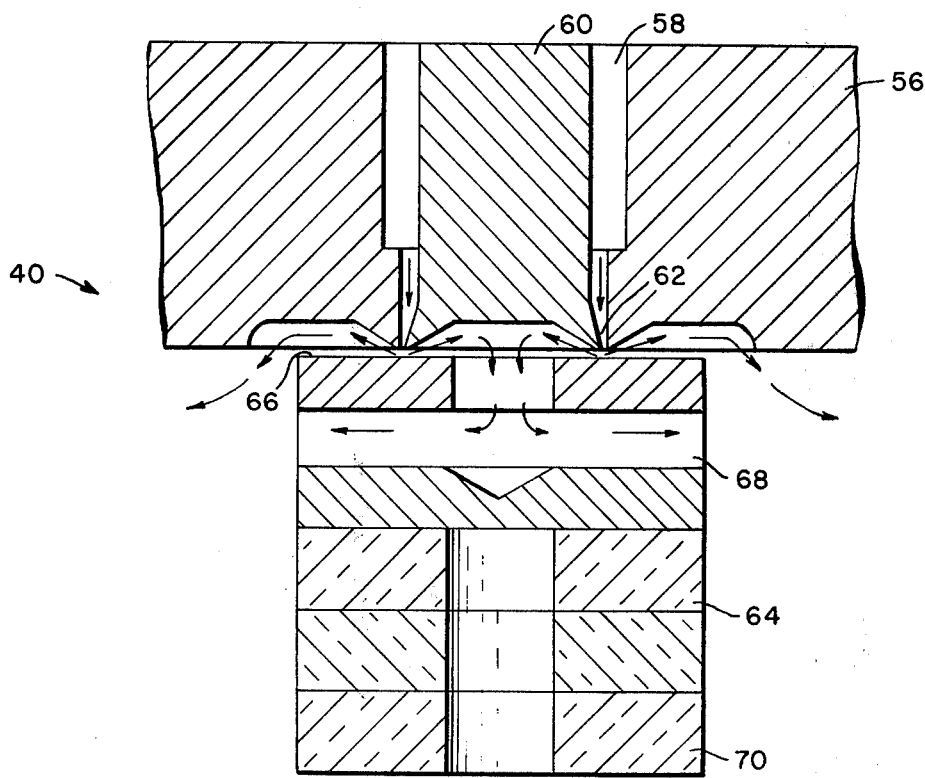
FIG. 3 is a further enlarged detail showing the hydraulic flow path through the valve orifice.

It is seen with the construction shown in detail in FIG. 3, the flow rate is increased and the reaction force onto the piezoelectric device is reduced by the annular orifice construction disclosed. The flow rate is proportional to the gap cross-section measured perpendicular to the disc, and in the present valve the flow area of the annular valve orifice is twice the value of a simple orifice because the annular orifice has two parallel gaps directing the flow radially inward and outward. Only the area of the annulus 62 is involved in producing reaction force onto the valve disc. The reduction in the force on the piezoelectric tube greatly eases the problem of achieving stable operation at reasonable frequencies, because with the reduced reaction force the piezoelectric device carries less compression load.

Each of the actuators 24 is appropriately connected into its electronic feedback loop to control the shape of mirror face 16 to concentrate the optical energy on a desired target, to overcome atmospheric distortions.

This invention having been described in the preferred embodiment, it is clear that it is susceptible to numerous modifications and embodiments within the ability of those skilled and without the exercise of the inventive faculty. Accordingly, the scope of this invention is defined by the scope of the following claims.

I claim:
1. In combination:
a body;
a plurality of electro-hydraulic-mechanical actuators, each of said actuators having a housing, and each of said actuators having an electro-mechanical device, a mechanical-hydraulic valve, a hydraulic-mechanical piston and a spring each mounted with respect to said body;
each said electro-mechanical device being mounted between said body and said valve so that upon electrical actuation of said electro-mechanical device, said electro-mechanical device moves a portion of said valve to control hydraulic flow through said valve to control hydraulic pressure on said piston, said piston being connected to said spring and said spring being connected to said body so that upon change in hydraulic pressure on said piston, said piston moves with respect to said body by resilient deflection of said spring; and
a face plate mounted with respect to said body, each of said pistons engaging with said face plate to deflect said face plate so that the shape of said face plate is controlled by electric signals to said electro-mechanical devices.

2. The combination of claim 1 wherein said valve comprises a valve plate and an orifice, said valve plate being mounted to be relatively moved by said electro-mechanical device and said orifice being directed toward said valve plate so that control of said electro-mechanical device controls the flow of hydraulic fluid out of said orifice.

3. The combination of claim 2 wherein said orifice has a central valve plug therein to define an annular orifice opening around said valve plug.

4. The combination of claim 3 wherein said valve plate has a central opening therein and a peripheral opening therearound so that hydraulic fluid under pressure discharging from said orifice toward said valve plate can discharge radially inward through said central opening in said valve plate and radially outward peripherally around said valve plate.

* * * * *